United States Patent
Christensen

(10) Patent No.: US 11,360,935 B2
(45) Date of Patent: Jun. 14, 2022

(54) EFFICIENT DATA STORAGE MANAGEMENT SYSTEM

(71) Applicant: Aparavi Software AG, Zug (CH)

(72) Inventor: Rod Christensen, Fresno, CA (US)

(73) Assignee: Aparavi Software AG, Zug (CH)

( * ) Notice: Subject to any disclaimer, the term of this patent is extended or adjusted under 35 U.S.C. 154(b) by 0 days.

(21) Appl. No.: 16/171,217

(22) Filed: Oct. 25, 2018

(65) Prior Publication Data
US 2020/0134040 A1 Apr. 30, 2020

(51) Int. Cl.
*G06F 16/00* (2019.01)
*G06F 16/11* (2019.01)
*G06F 16/182* (2019.01)
*G06F 16/185* (2019.01)

(52) U.S. Cl.
CPC .......... *G06F 16/125* (2019.01); *G06F 16/182* (2019.01); *G06F 16/185* (2019.01)

(58) Field of Classification Search
CPC .................................................... G06F 16/125
See application file for complete search history.

(56) References Cited

U.S. PATENT DOCUMENTS

| 2005/0055519 A1* | 3/2005 | Stuart ................... G06F 16/125 |
| | | 711/159 |
| 2005/0125411 A1* | 6/2005 | Kilian ................ G06F 16/2477 |

* cited by examiner

*Primary Examiner* — Ajith Jacob
(74) *Attorney, Agent, or Firm* — SoCal IP Law Group LLP; Mark Andrew Goldstein

(57) ABSTRACT

An efficient data storage system is described. An agent software application on computing devices in a first tier processes snapshot backups and pushes them to an appliance software application on a server in a second tier. The appliance software application processes archive backups and pushes them to cloud storage in a third tier. A cloud application on a management server receives storage policy specifications from customers and promulgates the policies to the agent software application and the appliance software application. The policy specifications include time periods and retention set information for the backups. When a retention set has been exceeded, the storage system is pruned to remove file references to unneeded files and delete data files no longer referenced in storage sets in the retention set.

4 Claims, 14 Drawing Sheets

EFFICIENT DATA STORAGE MANAGEMENT SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to efficiently storing data in a tiered data storage system.

Description of the Related Art

Various applications may store large numbers of documents, images, audio, videos and other data, all of which are referred to herein as data. The data may be stored by application program and by computer users, and the data may be stored automatically and manually. Plus, the data may be stored daily, weekly, every four hours, or otherwise regularly. Some systems and applications store data upon the occurrence of a change in all or a portion of the data. The data may be stored while certain kinds of data are being created or edited. The data may be stored for backup and recovery purposes or for data resiliency. All of this results in the storing of multiple versions of the same data. The data may be stored locally in one or more storage systems, and also in one or multiple cloud-based storage systems. The data may on a regular basis be stored so that multiple versions of data are accessible. The data may be stored in multiple locations for resiliency. Although the costs for data storage are regularly declining, ongoing storage of multiple versions of data results in a large amount of data and resulting large economic costs for data storage. Moreover, there is a computing cost incurred in maintaining version and location information for the data and portions thereof.

DETAILED DESCRIPTION

The systems and methods described herein provide for management and configuration of a tiered data storage system.

Environment

Figure 1:
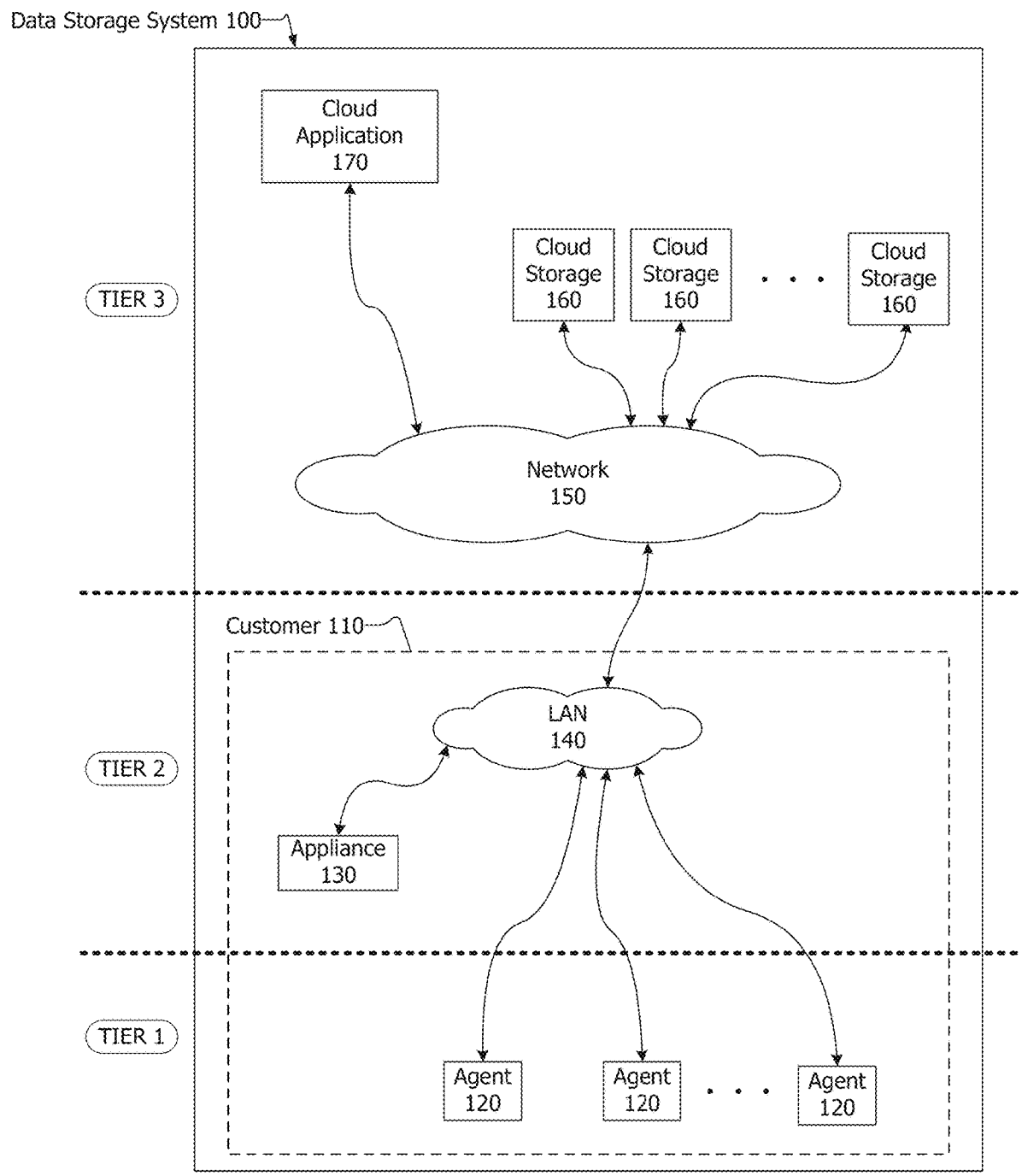
FIG. 1 is a virtual block diagram of a tiered data storage system.

A three-tiered data storage system and related methods for configuration and management of the data storage system are described herein. FIG. 1 is a virtual block diagram of a tiered data storage system. The data storage system 100 includes a cloud application 170 that manages the data storage system. The cloud application 170 of data storage system 100 supports multiple customers 110, although only one is shown for simplicity in FIG. 1. The cloud application 170 receives storage configuration information and requirement including policy specifications that determine how and when data is stored in the data storage system. The cloud application 170 provides a graphical user interface to allow customer representatives to specify storage policies and may also receive information via an application program interface (API) with the storage policy information.

At the lowest or first tier of the data storage system, multiple agents 120 at the customer location create and/or are a source, originator or recipient of data that is stored by the agent. The agents 120 are connected to one or more local area networks (LAN) 140 at the customer location, and may span one or more offices, floors, buildings and/or campuses, and may also be connected through a wide area network (WAN) (not shown). Also at the customer location and connected to the LAN 140 (and/or customer WAN) is at least one appliance 130. The appliance 130 and its associated or included storage are the second tier in the data storage system. The second tier local storage system may be one or more storage devices included in the appliance, coupled directly to the appliance, or accessible by the appliance via the LAN 140 (and/or customer WAN). Although only one appliance 130 is shown for simplicity, multiple appliances may be included in the data storage system.

The agents 120 (in the first tier) store data as it is created or received. In addition, in one embodiment, the agents 120 also store checkpoints of the data on a regular basis. The ability to store checkpoints of the data is optional and may not be provided in every embodiment. Checkpoints of data stored at the agents may be created on a regular basis in a short time window, typically every quarter hour, every half hour, every three-quarters of an hour, or every hour according a policy received from the cloud application 170. These times are only examples, other time periods for checkpoints can be used. Stated another way, checkpoints define when local backups of data are stored in the first tier of the data storage system. When included in the data storage system, checkpoints may be specified based on a clock such as every half hour on the hour an on the half hour of a clock, or may be every half hour, for example, from when the checkpoints is specified, such as for example if a 30 minute checkpoints is specified at 10:23 a.m., the checkpoints will be processed at 23 and 53 minutes past the hour every hour of the day. In various embodiments, checkpoints may be specified based on a clock having single minute, 5 minute, quarter hour, third of an hour, half hour and hour granularity.

In the second tier of the data storage system, data from the agents 120 is stored on the appliance 130 in the second tier of the data storage system according to policies stored at the agent 120 received from the cloud application 170. The storage of data originating at agents 120 and stored at appliances 130 is called capturing a snapshot the customer's data. Snapshots are a greater, larger or longer time period than the window of time specified by a checkpoint. Snapshots are typically daily and may be every 12 hours, every 18 hours, every 24 hours, every 48 hours, every 72 hours, etc. as specified in the policy at the agent. These are only example snapshot time periods. At the time of a snapshot, data changed from the last snapshot on agents 120 is stored on the appliance 130. In practice, the snapshot data from the agents 120 is pushed by the agents 120 to the appliance 130 according to the snapshot time period for that particular agent. In this way, snapshots define how data is stored in the second tier of the data storage system.

When the connection between the agents 120 and appliance 130 is down, the agent 120 is configured to temporarily store or cache the snapshot data on the agent until the connection is reestablished. That is, whenever a snapshot time period is reached, a snapshot is created on the agent 120 even when the connection to the appliance 130 is down. Multiple snapshots may be stored on the agent 120 when the connection to the appliance 130 is down. When the connection between the agents 120 and appliance 130 is reestablished, any cached snapshots are pushed to the appliance 130. The communication between the agents 120 and appliance 130 over LAN 140 may be down when the agent is a computing device on a vehicle that comes and goes, when a router or other networking device is down, when an electrical problem occurs and impacts the LAN 140, and others.

In the third tier of the data storage system, data from the appliance 130 is stored at one or more cloud storage 160 in the third tier of the data storage system. The storage of data from appliance 130 at cloud storage 160 is called capturing an archive of the customer's data. Archives stored on cloud storage 160 are communicated from the appliance 130 of the customer 110 over a network 150 such as, in one embodiment, the Internet, or a private WAN, or a combination of these. In practice, the archive data from the appliances 130 are pushed by the appliances 130 to the cloud storage 160 according to the archive time period for the particular originating agent. Cloud storage 160 may be private cloud storage or cloud storage provided by third party cloud services. Archives are a greater, larger and/or longer time period than the window of time specified by a snapshot. Archives are typically weekly and may be every 3 days, every 4 days, every 5 days, every week, every 10 days, every 2 weeks, etc. as specified in the policy for a particular agent 120 that is stored on the appliance 130 as received from the cloud application 170. These are only example archive timeframes. At the time of an archive, data changed from the most recent archive from appliance 130 for the particular agent(s) 120 are stored on the cloud storage 160. In this way, archives define how data is stored in the third tier of the data storage system. In sum, the archive time period is typically greater than the snapshot time period which is typically greater than the checkpoint time period. However, these time periods are user configurable and could all be the same or can all be different.

The specification of checkpoints, snapshots and archives is made in policies defined in and managed by cloud application 170, described in more detail below. In addition, the cloud application allows for designating which policies apply to which agent and also allows for designating a cloud storage location or provider. Policies specified by a user or customer via the cloud application 170 are passed from the cloud application to the appliance 130 and ultimately to the agents 120. Each agent 120 may have the same or different policies from other agents 120. The same or multiple policies may be specified in the cloud application and promulgated down to the appliances 130 and agents 120. The policies are applicable to particular agents and define the checkpoints, snapshots and archives for data originating at the particular agent.

Figure 2:
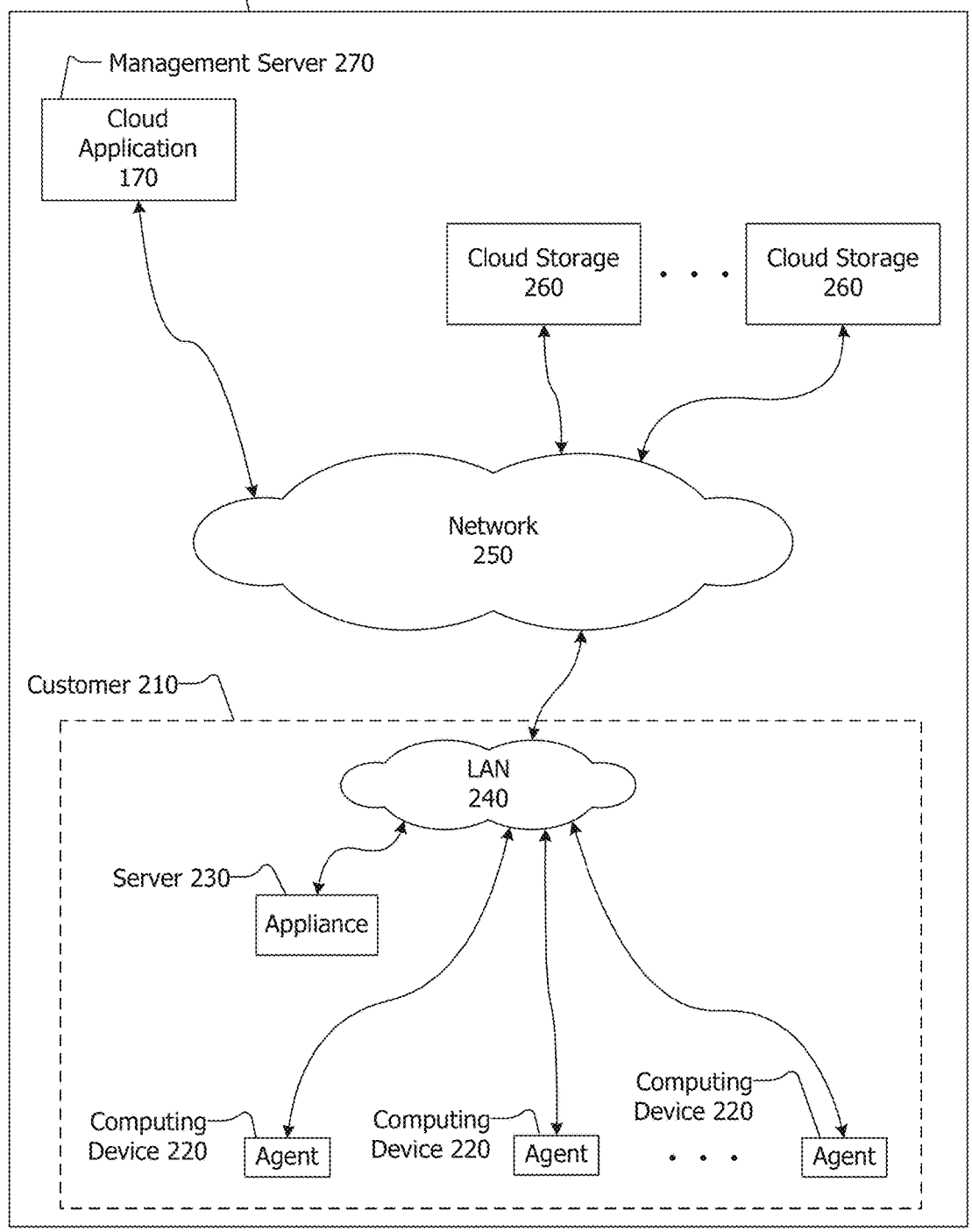
FIG. 2 is a block diagram of a tiered data storage system.

Referring now to FIG. 2, a block diagram of a tiered data storage system is shown. The data storage system 200 includes a management server running a cloud application 170. The cloud application manages the data storage system including providing a graphical user interface for obtaining specification of policies that include information about snapshots, checkpoints and archives from persons associated with customers. The terms policy and storage policy are used to describe the checkpoints, snapshots and archives specified by the customer. The cloud application 170 on management server 270 communicates via the network 250 with multiple customers 210, although only one customer is shown for simplicity. Each customer has at least one server 230 that runs appliance software such that the server 230 performs as an appliance. Although only one server 230 is shown for simplicity, multiple servers may be included in the data storage system. The server 230 has at least one local storage system included therein, coupled thereto directly and/or coupled via local network 240, such as for example, internal hard disk drives (HDDs), an array of disk drives such as a RAID array, and/or a network attached storage device (NAS). Multiple computing devices 220 such as personal computers, laptop computers, servers, workstations or similar computing devices run an agent application. In addition, the data storage system 200 includes access to at least one and typically multiple third party storage providers shown as third party cloud storage 260 which are accessible to the customer server 230 via the network 250. Archives stored on cloud storage 260 are communicated from the appliance 230 of the customer 210 over network 250 which is, in one embodiment, the Internet, or, in another embodiment, a private WAN, or a combination of these. Cloud storage 260 may be private cloud storage or cloud storage provided by third party cloud services. That is, the archives are created by and pushed by the appliance 130 on the server 230 to the cloud storage 160/260.

In one embodiment, the customers 210 and their servers 230 may be separated geographically from the management server 270 and the third party cloud storage 260 when the network 250 is the Internet. In another embodiment, the customers 210 and their servers 230 may be geographically close or may be separated when the network 250 is a private WAN and the cloud storage 260 is a private customer cloud system. Each of the customers 210, the management server 270 and the third party storage providers 260 may be in separate states, may be in separate countries, may be in separate cities, may be in the same state, may be in the same region, may be in the same city or may be in the same country, or a combination thereof.

The network 250 is a wide area network that may include wired and wireless networks and may be the Internet or a private WAN. In another embodiment, the network 250 may be a customer LAN, such as when cloud storage 260 is a private customer cloud storage system. Each of the local area networks 240 are private networks not accessible directly via the Internet or by other customers. In another embodiment, the LAN 240 may be a private WAN. The network 250 includes networking devices such as routers, hubs, switches, other servers, firewalls, security devices, and the like. The network 250 may include wired and wireless networks. The local area network 240 may include networking devices such as routers, hubs, switches, other servers, firewalls, security devices, and the like. The local area network 240 may include wired and wireless networks.

The term data as used herein includes a bit, byte, word, object, block, stripe or other unit of information. In one embodiment, data is stored within and by the data storage system as components. Data may be stored as one component or multiple components. That is, a component may be a data item or a portion of a data item, depending on the size of the component in comparison to the size of the data item. As used herein, the term data item is inclusive of entire computer readable files or portions of a computer readable file. The computer readable file may include or represent text, numbers, data, images, photographs, graphics, audio, video, raw data, scientific data, computer programs, computer source code, computer object code, executable computer code, and/or a combination of these and similar information.

Many companies store a large quantity of data. And even if a company stores a relatively small amount of data, over time the totality of the data grows resulting from a combination of creating new data and editing existing data. Regardless of the total amount of data stored by a company, the amount is always growing. The data, newly created and older versions, is stored for retrieval and access according to business needs and government compliance obligations.

Each of the servers, and, in particular, the management server 270 and the customer server 230, as well as each of the computing devices 220 are computing devices that include memory, typically include storage, include at least one network interface, and include a processor on which software may execute. The management server 270 is a cloud-based server or group of servers that may be owned and maintained by the data storage system service provider, or may be part of a shared server or group of servers on which the data storage system service provider rents, leases or otherwise secures access along with other companies. The computing device may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The processes, functionality and features described herein may be embodied in whole or in part in software in the form of a cloud application 170 which operates on a management server computer 270 in coordination with a software appliance 130 operating on a customer server 230 and a software agent 120 executing on customer computing devices 220, each of which may be in the form of one or more of an application program, object code, machine code, an executable file, an applet, a COM object, a dynamic linked library (DLL), a dynamically loaded library (.so), a script, one or more subroutines, a web browser plug-in or add-on, or an operating system component or service, and other forms of software.

Although shown and described concerning server computers (270 and 230) and computing devices (220), the method may be implemented on other computing devices. A computing device as used herein refers to any device with a processor, memory, network interface and a storage device that executes instructions such as software including, but not limited to, server computers, personal computers, portable computers, laptop computers, set-top boxes, streaming media devices, cameras, video cameras, audio capturing devices, smart speakers, smart home appliances such as refrigerators and ovens, smart phones and tablet computers. The computing devices may run an operating system, including, for example, versions of the Linux, Unix, MICROSOFT® Windows, Solaris, Android, Chrome, and APPLE® Mac OS X operating systems. The network interface in the computing devices may be in the form of a card, chip or chip set that allows for communication over a wired and/or wireless network. The network interface may allow for communications according to various protocols and standards, including, for example, versions of Ethernet, INFINIBAND® network, Fibre Channel, WiFi and others.

Each of the customer servers 230 and computing devices 220 have local storage that is internal, included in, and/or external, coupled with or accessible to the customer servers 230 and computing devices 220. Computing devices 220 will often be servers but can be personal computer, workstations and other computing devices. When internal, the local storage may be one or multiple storage devices such as hard disk drives and solid-state drives which may be one or more single storage devices, multiple storage devices arranged in a RAID or other configuration, an internal array or arrays of storage devices, a just a bunch of disks (JBOD) storage device, and arrangements and configurations. When external, the local storage may be a dependent or independent network attached storage (NAS) device or system, a just a bunch of disks (JBOD) storage device, and others coupled directly to the customer server 230 or coupled to the customer server 230 via a local area network (LAN) 240. The computing devices 220 typically have internal storage and may include external storage.

In one embodiment, smaller, less robust devices such as streaming media hardware, internet of things devices, sensors, switches, and others are coupled with or otherwise communicate data upon capture or sensing to the agent application 120 on computing device 220. In this embodiment, the agent does not create data but captures or receives data that is stored in the data storage system. In another embodiment, the computing device 220 running the agent application 120 may be a smaller, less robust device such as streaming media hardware, internet of things device, sensor, switch, and others which communicate data upon capture or sensing to the appliance application 130 at the customer server 230. In this embodiment, the agent is limited and does not have its own storage even though it may run the agent from its memory, PROM, EEPROM, firmware, and the like.

The terms "storage media" and "storage device" are used herein to refer to nonvolatile media and storage devices. Nonvolatile media and storage devices are media and devices that allow for retrieval of stored information after being powered down and then powered up. That is, nonvolatile media and storage devices do not lose stored information when powered down but maintain stored information when powered down. Storage media and devices refer to any configuration of hard disk drives (HDDs), solid-states drives (SSDs), silicon storage devices, magnetic tape, optical discs, nonvolatile RAM, carbon nanotube memory, ReRam memristors, and other similar nonvolatile storage media and devices. Storage devices and media include magnetic media and devices such as hard disks, hard disk drives, tape and tape players, flash memory and flash memory devices; silicon-based media; nonvolatile RAM including memristors, resistive random-access memory (ReRam), and nano-RAM (carbon nanotubes) and other kinds of NV-RAM; and optical disks and drives such as DVD, CD, and BLU-RAY® discs and players. Storage devices and storage media allow for reading data from and/or writing data to the storage device/storage medium.

The cloud storage 260 include multiple servers and multiple storage devices arranged in any of a variety of configurations. The cloud storage 260 may be third party cloud storage providers that include multiple servers and multiple storage devices arranged according to the particular third party storage provider. Third party storage providers include, for example, Amazon Simple Storage Service (S3), Microsoft Azure cloud storage, IBM Cloud Object Storage, and others.

The techniques discussed herein are described with regard to storage media and storage devices, namely, readable and writable optical, magnetic and silicon-based storage media including hard disk drives, magnetic tape, optical discs, and solid-state drives. The techniques may be implemented with other readable and writable optical, magnetic and silicon-based storage media as well as other storage media and devices described herein.

In the data storage system 200 shown in FIG. 2, the agent 120 from FIG. 1 runs on the computing device 220, the appliance 130 from FIG. 1 runs on the server 230, and the cloud application 170 from FIG. 1 runs on the management server 270 to store data as components among customer's local storage on computing devices 220, on server 230 as well as at least one cloud storage 260 according to storage policies captured by the cloud application 170 and distributed to the agents 120 on the computing devices 220 through the appliance 130 on the server 230.

The cloud application 170 on the management server 270 provides an interface for the customer to configure aspects and features of the data storage system, and, in particular, the storage policies. Storage policies define protection sets for all data for a customer or certain data for the customer 210 based on the agent computing device. The cloud application 170 allows a customer to specify the local or primary backup storage location in the second tier of the data storage system as well as one or more secondary backup storage locations in the third tier of the data storage system in the storage policies. The primary backup storage location is a storage device or system included in, coupled with or locally accessible to the customer server 230. The secondary backup storage location may be one or more cloud storage systems 260 which may be third party cloud storage or private cloud storage. Secondary backup storage may additionally or alternatively include remote or distributed network accessible storage devices maintained by the customer. The cloud application 170 provides a cloud-based user interface that allows the customer to set storage policies and configure the data storage system. In addition, the cloud application may provide an application program interface (API) through which customers may define policies. Depending on the embodiment of the data storage system and/or customer preferences, the cloud application 170 provides for manual and/or guided configuration. A manual configuration embodiment allows the customer the ability to directly specify storage policies. A guided configuration embodiment allows the customer to answer questions provided by the cloud application such that the cloud application creates storage policies based on the customers answers to the questions provided by the cloud application.

As used herein, storage policies for the protection set specify how often the customer's data maintained by the data storage system is distributed throughout the storage system and how many protections sets should be retained, as well as where the data should be stored for each tier. That is, the storage policies for the protection set specify two items, [1] how often data is stored, also known as a retention schedule, and [2] the maximum number of protection sets stored. The times and days the backup should occur or should not occur may be specified. For example, the customer may be able to select start and stop times, periods when backups should not be run, periods when backups should be run, days backups should be run, days backups should not be run, and the like. A retention time period may also be specified. The retention period may be mandated by law, rules, regulations and the like promulgated by industry, government or other organization. For example, there may be mandated retention periods regarding storing historical medical data for health care providers, such as according to Health Insurance Portability and Accountability Act (HIPPA), storing financial information mandated by the Securities and Exchange Commission (SEC), and others. The cloud application on the management server may allow the customer to specify the retention period as part of the storage policies used in creating protection sets.

How often data is stored is described as one or more of checkpoints, snapshots and archives which form the storage policies for the particular customer. The storage policies also include the locations for the particular kinds of storing. The term checkpoint refers to a relatively frequent copy or storing to a local storage device, such as another directory or drive in an internal storage system on a customer server. These checkpoints could occur every half hour, hourly, every 2 hours, every 3 hours, etc. and comprise the first tier of storage. Checkpoints may be optional and may not be supported in all versions of the data storage system. The term snapshot refers to a frequent but less frequent storage timing than a checkpoint, such as, for example daily, twice a day, every other day, etc. The snapshot stores the customer's data to a storage device coupled with or accessible to the customer server in the second tier of storage. The archive is a longer period of time such as twice a week, weekly, every 10 days, every 2 weeks, etc. The archive is stored to a cloud storage system which comprise the third tier of storage. The storage policies may specify additional features and actions representing storage management capabilities of the data storage system. The policies define the replication and retention requirements of the customer obtained by the cloud application 170 of the management server 270 and promulgated to the appliance 130 on the customer server 230 and to the agents 120 on the computing devices 220.

The data storage system 100/200 described herein provides for storage replication, retention and data resiliency. To use storage space more efficiently, the data storage system processes data in a new way. A limited amount of redundancy is built into the system so that common data portions need not be copied multiple times when performing data storage or retention actions. The partial replication does not require that a full file or full portion of data be copied upon storing each version of the file. Rather, only the changed portions of data are stored. This technique is called differencing.

Processes

Figure 3:
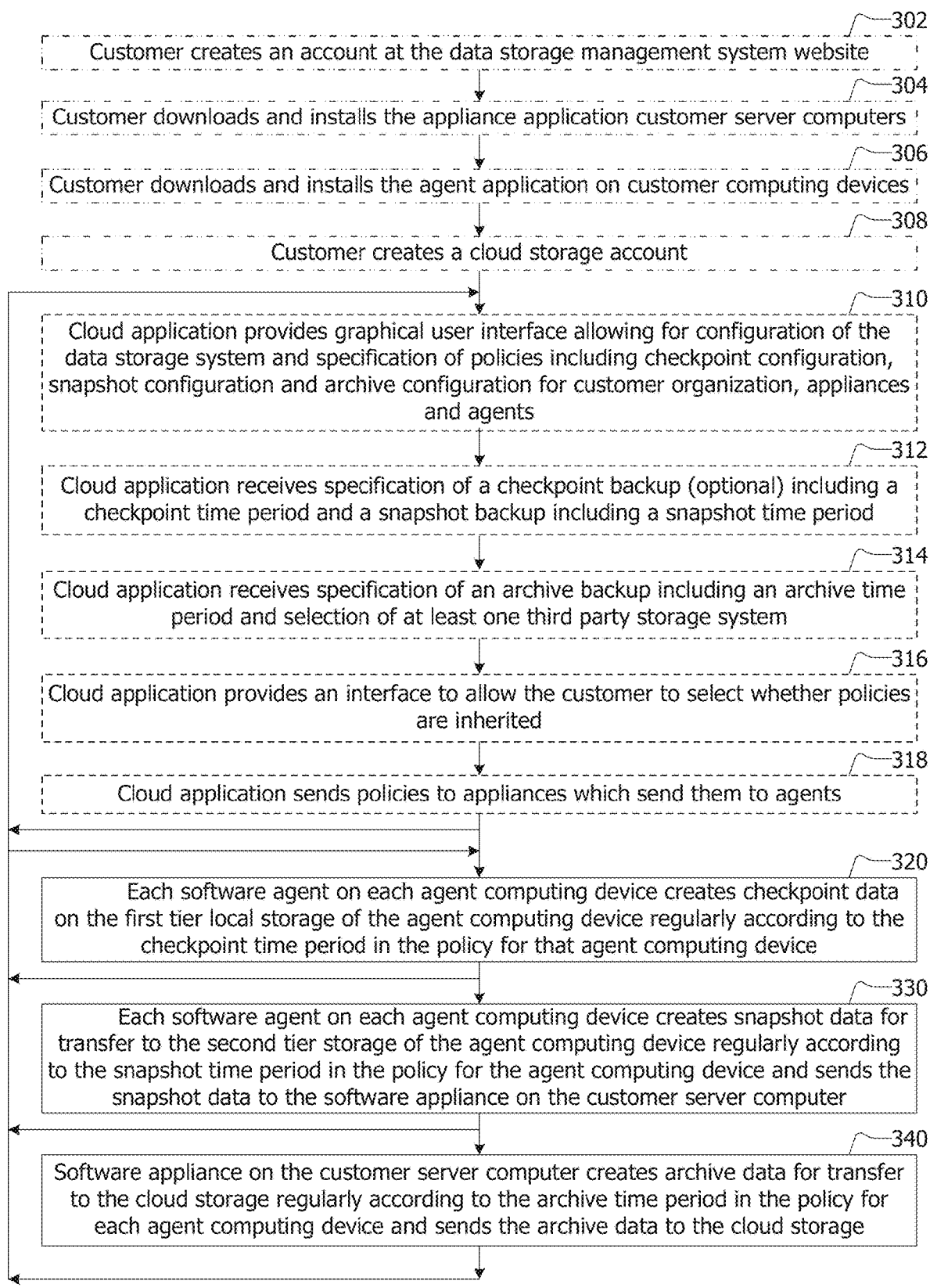
FIG. 3 is a flow chart of the actions taken to configure a tiered data storage system.

Referring now to FIG. 3, a flow chart of the actions taken to configure a data storage management system is shown. As preliminary actions, the customer creates an account with the cloud application at the data storage management system website, as shown in block 308. This is done by a customer connecting to a web page of the data storage system where the customer may be prompted to create an account including contact information and payment information such as a credit card. The data storage management system website provides and serves the cloud application.

After the customer has created an account and logged into the cloud application, the customer specifies a customer organization. Under each customer organization, the customer creates an arrangement of customer servers to run the appliance application and those customer computing devices to run the agent application under the particular appliances. To do this, after the customer specifies a customer organization, the customer downloads and installs the appliance application on at least one customer server computer, as shown in block 304, to be in that customer organization. The appliance application is downloaded from the website of the company providing the data storage management system. The download is initiated through a web browser executing on the customer server where the appliance application is to be installed. During the download of the appliance application, the cloud application includes an appliance configuration file includes a customer identifier and the Internet Protocol (IP) address or web address of the cloud application, such as, for example, an Internet address associated with the provider of the data storage management system. This is the address where the cloud application resides. After the cloud application is downloaded it is executed and installed. During the installation, the appliance application accesses the configuration file. The appliance application being installed on a customer server may be referred to as the appliance application (and customer server) registering with the cloud application. After the appliance application is installed on a customer server, the cloud application provides a user interface to allow the customer to specify and install the agent application on customer computing devices under the customer server.

The customer then downloads and installs the agent application on customer computing devices, as shown in block 306. The agent application is downloaded from the website of the company providing the data storage management system. The download is initiated through a web browser executing on the customer computing device where the agent application is to be installed. During the download of the agent application, the cloud application includes an agent configuration file that includes a customer identifier and the Internet Protocol (IP) address of the customer server computer running the appliance application under which the agent was created. This may be referred to as the agent application (and customer computing device) registering with the appliance on the customer server.

So that archive storage may be managed by the data storage management system, the customer should create a cloud storage account, as shown in block 308. The cloud storage account is typically created at a third party cloud storage provider, and may alternatively or additionally be an account on a private cloud storage server managed by the customer.

After the appliances and agents have been installed and arranged using the cloud application, the cloud application provides a graphical user interface allowing for configuration of the data storage system and specification of policies including checkpoint configuration, snapshot configuration and archive configuration for organizations, appliances and agents, as shown in block 310. The client application prompts the user to create a policy specification. Multiple policies may be specified. After policies are created, they will be distributed down from the cloud application to appliances and then down to agents. When there is no policy specified for a particular agent, the policies for the agent are inherited from the appliance the agent is under. When there is no policy specified for a particular appliance, the policies for the appliance are inherited from the customer organization in which the appliance was installed. There may be multiple policies for a customer organization. After a customer selects a particular customer organization, a particular appliance or a particular agent, the cloud application allows the customer to select "policies" or "create policies" to activate the policy specification interface via a user interface item such as a menu item available by clicking on or otherwise activating the menu associated with the selected customer organization, appliance or agent.

The policy specification interface is configured to guide the customer in specifying the details for the checkpoint configuration, snapshot configuration and archive configuration. Checkpoints and snapshots are used to determine how often and when data is copied from the source agent to the appliance for snapshots or to the local disk for checkpoints. In one embodiment, after prompting a customer to specify a checkpoint backup (optional) including a checkpoint time period and after prompting a customer to specify a snapshot backup including a snapshot time period, the cloud application receives specification of a checkpoint backup including a checkpoint time period and a snapshot backup including a snapshot time period, as shown in block 312. After prompting a customer to specify an archive backup including an archive time period and selection of at least one third party storage system, the cloud application receives specification of an archive backup including an archive time period and selection of at least one third party storage system, as shown in block 314. In another embodiment, the archive backup specification may include the customer specifying or selecting a private cloud server hosted by the customer. The cloud application provides an interface to allow the customer to select whether the checkpoint, snapshot and/or archive policies for the selected customer organization, appliance or agent should be inherited, as shown in block 316. The policy inheritance option from block 316 may replace, precede or supersede the configuration of checkpoints, snapshots and archives from blocks 312 and 314. The cloud application receives specification of policies and sends the policies to applicable appliances and agents, as shown in block 318. More specifically, the cloud application sends the policies down to applicable appliances which send the policies down to applicable agents Additional policies may be specified, wherein the flow of actions returns to block 310. After policies have been specified and the cloud application has sent the policies to agents and appliances, the method continues at block 320.

Each software agent on each agent computing device creates checkpoint data on the first tier local storage of the agent computing device regularly according to the checkpoint time period in the policy for that agent computing device, as shown in block 320. In this way, the agent regularly or periodically checks the policies for data storage management and performs checkpoints accordingly. The actions in block 320 are optional as not all embodiments offer a checkpoint option. The flow of actions continues with repeating the checkpoint in block 320 regularly and with, when the snapshot time period has been reached proceeding with block 330. Each software agent on each agent computing device creates snapshot data for transfer to the second tier storage of the agent computing device regularly according to the snapshot time period in the policy for the agent computing device and sends the snapshot data to the software appliance on the customer server computer, as shown in block 330. In this way, the agent regularly or periodically checks the policies for data storage management and performs snapshots accordingly. The flow of actions continues with returning to process checkpoint backups in block 320, with, when the snapshot time period has been reached, repeating block 330, or continuing to block 340.

When the archive time period has been reached, the flow of actions continues with block 340 in which the software appliance on the customer server computer creates archive data for transfer to the cloud storage regularly according to the archive time period in the policy for each agent computing device and sends the archive data to the cloud storage, as shown in block 340. In this way, the appliance, regularly or periodically checks the policies for data storage management and performs archives accordingly. The flow of actions then continues at blocks 320 or 330, depending the functionality of the system and the policies specified by the customer, or at block 310 with the specification of an additional policy.

Storing Data Efficiently

When a checkpoint, snapshot or archive of data is created, only the new portions of a data set are stored. That is, a difference between the current data and most recent data is evaluated, and only the changed files amounting to differences between the current data and most recently stored data are stored in the particular checkpoint, snapshot or archive. In this way, the amount of data stored at each of the checkpoint, snapshot or archive is much less than a complete backup of the entire data set.

Figure 4:
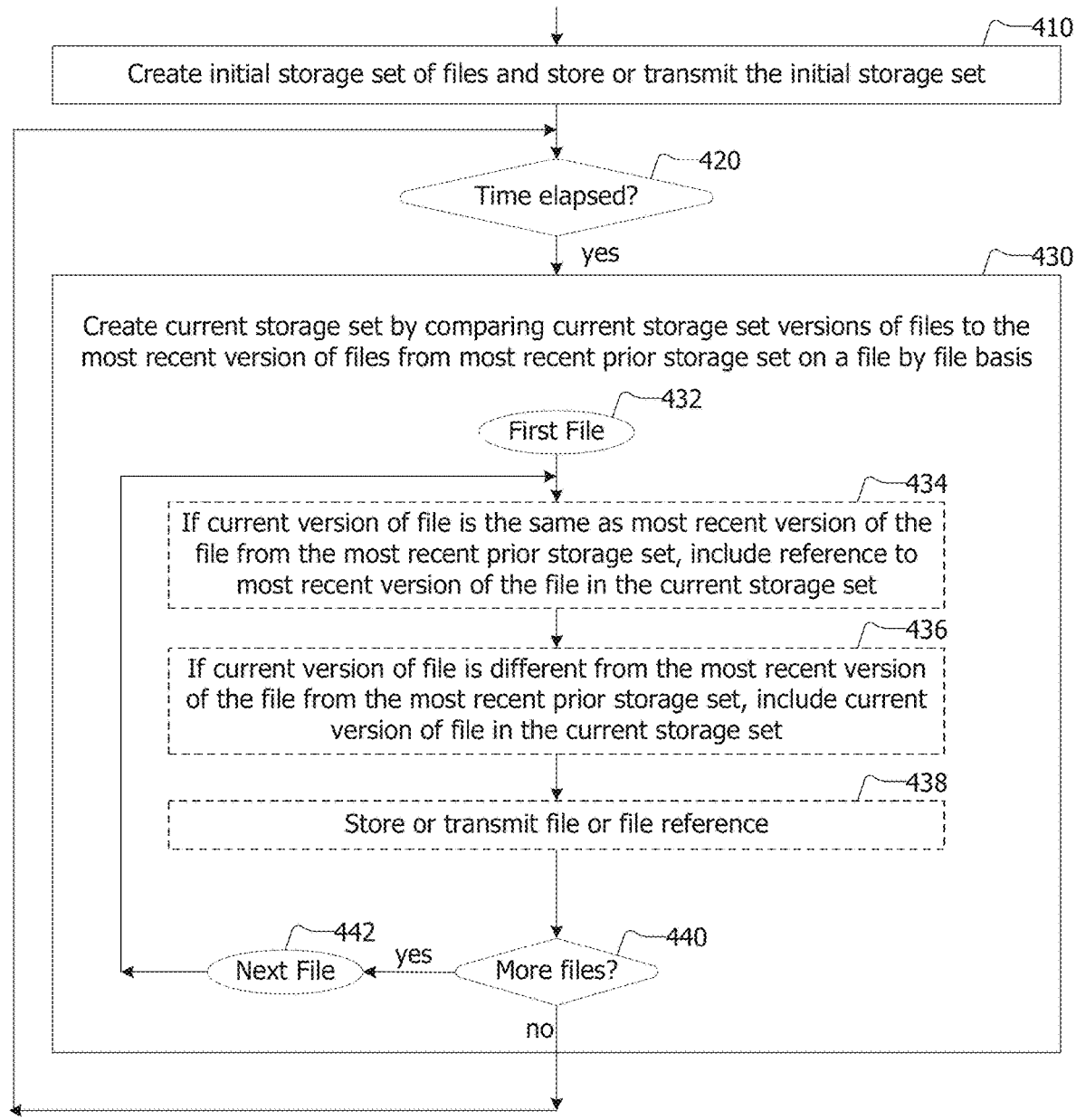
FIG. 4 is a flow chart of the actions taken to store data efficiently in a data storage system.

FIG. 4 is a flow chart of the actions taken to store data efficiently in a data storage system. When creating a current checkpoint, snapshot or archive, the agent or appliance does this efficiently so that a full set of data is not typically needed. Each of the checkpoint, snapshot and archive are referred to generally as a storage set so as to easily describe the storage method applicable to each of the checkpoint, snapshot and archive. Each of the checkpoint, snapshot and archive include multiple files. First, an initial storage set of files is created by the agent or appliance and either stored or transmitted, as shown in block 410. The storage set being created is determined by each agent in accordance with the policy for that agent.

The policy also includes a time period, as described above. A check is made to determine if the time period has elapsed, as shown in block 420. When the time period has elapsed, the agent or appliance creates a current storage set by comparing current versions of files to the most recent version of files from most recent prior storage set on a file by file basis, as shown in block 430. On a per file basis, this involves one of two actions. If the current version of a file is the same as the most recent version of the file from the most recent prior storage set, a reference to the most recent version of the file in the current storage set is included in the current storage set instead of the current file itself, as shown in block 434. A reference may be a pointer, a link, an address on disk, an address in a network, a file identifier or other relatively simple numeric or alphanumeric way of identifying a file. The reference may include two parts, a set identifier or name and a component identifier for the file in that set. Each of the set identifier and component identifier may be a sequence of numeric and/or alphanumeric characters and punctuation. Because the size of the reference is much smaller in size than the entire file, a significant storage space savings is achieved. If the current version of a file is different from the most recent version of the file from the most recent prior storage set, the current version of the file is included in the current storage set, as shown in block 436. The file from block 436 or the reference from block 434 is then stored or transmitted, depending on the kind of storage set.

A check is made to determine if there are more files to be evaluated for inclusion in the current storage set, as shown in block 440. If there are additional files to be considered, the flow of actions continued with the next file, as shown in block 442. The flow of actions continued with block 434. If there are no more files to be considered for the current storage set, the flow of actions is complete and the process continues at block 420. By only storing or transmitting files different from the most recent prior storage set, that is only new files or newly modified files, the size of a current storage set is much small than a full storage set that includes the actual data for all files in the storage set.

FIGS. 5 through 9 provide an example showing how the functioning of the efficient storage method of FIG. 4. The example involves a snapshot as the storage set. So, the agent application on a customer computing device would execute the method of FIG. 4 to achieve the actions show and described regarding FIGS. 5 through 9.

Figure 5:
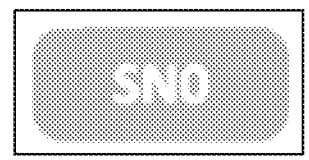
FIG. 5 is a virtual block diagram showing a first example snapshot of data in a data storage system.
Figure 5:
Figure 5:
Figure 5:
Figure 5:
Figure 5:
Figure 5:
Figure 5:
Figure 5:
Figure 5:
Figure 5:

Referring now to FIG. 5, a virtual block diagram showing a first example snapshot of data in a data storage system is provided. FIG. 5 shows snapshot SN0 comprised of 10 data files, each the first version. The drawing shows the result of block 410 of FIG. 4 in which an initial storage set of files is created. After the first storage set is created, a second storage set is evaluated and created after the snapshot time period has elapsed (see block 420 of FIG. 4).

Figure 6:
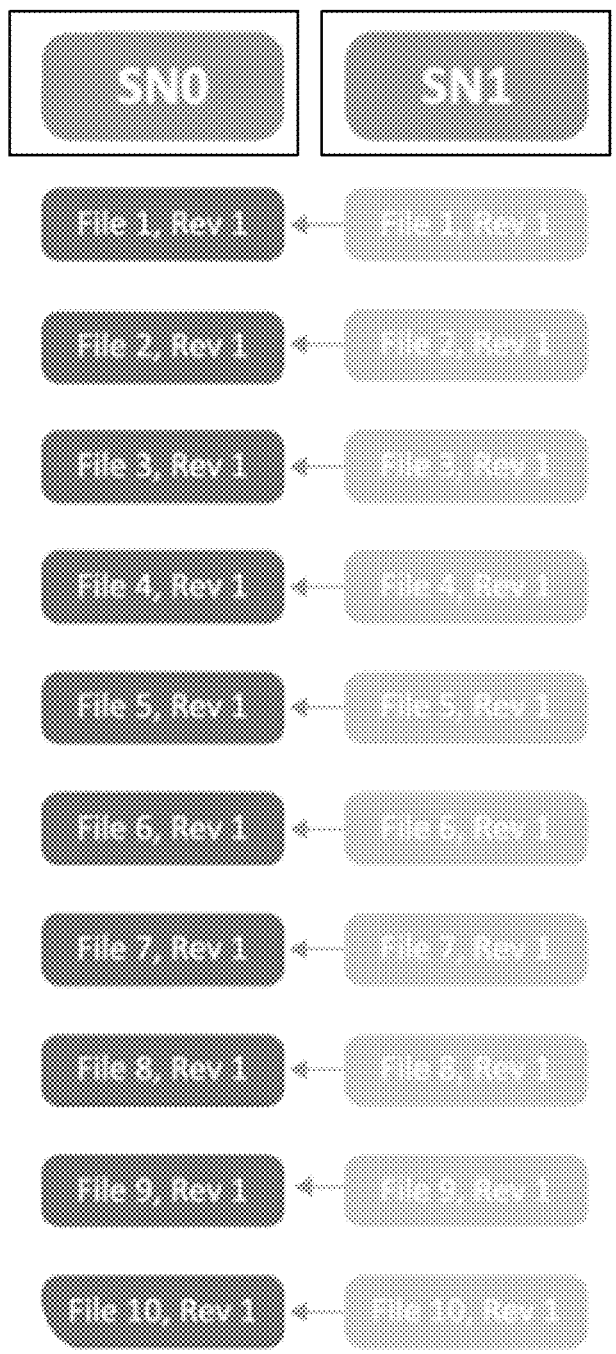
FIG. 6 is a virtual block diagram showing the relationship between first and second example snapshots of data in a data storage system.

Referring now to FIG. 6, a virtual block diagram showing the relationship between first and second example snapshots of data in a data storage system is provided. In this example, all the files are the same so that the current storage set SN1 includes the same files as the initial storage set SN0. Because all the files are the same, the current storage set, that is, the second storage set SN1 includes only references to initial versions of the files designated by lighter grey in the drawing. File references are depicted in light grey, and data files are depicted in dark grey. This is achieved by looping through and repeatedly executing the actions in blocks 434, 438, and 439 until there are no more files to consider for the current storage set.

Figure 7:
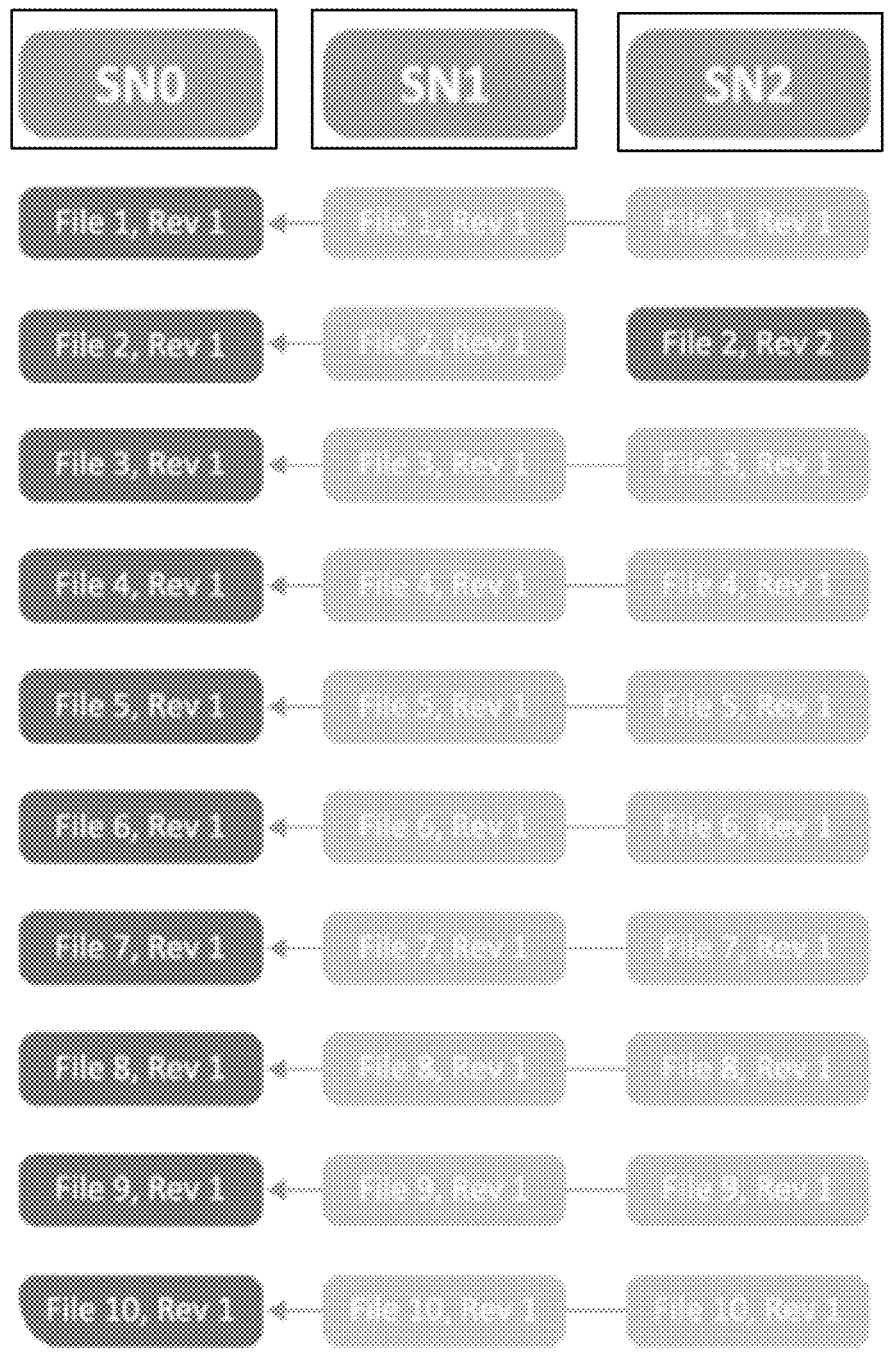
FIG. 7 is a virtual block diagram showing the relationship between first, second and third example snapshots of data in a data storage system.

Referring now to FIG. 7, a virtual block diagram showing the relationship between first, second and third example snapshots of data in a data storage system is provided. In this example, as shown by the darker grey, the only file in snapshot SN2 that differs from the files in snapshot SN1 is shown as File 2, Rev. 2. Because all but one of the files are the same, the current storage set, that is, the third storage set SN2 includes nine references to initial versions of the files designated by lighter grey in the drawing and one actual data file of a current, newer version of a file, namely File 2, Rev. 2. This is achieved by looping through and repeatedly executing the actions in blocks 434, 436, 438, and 439 until there are no more files to consider for the current storage set.

Figure 8:
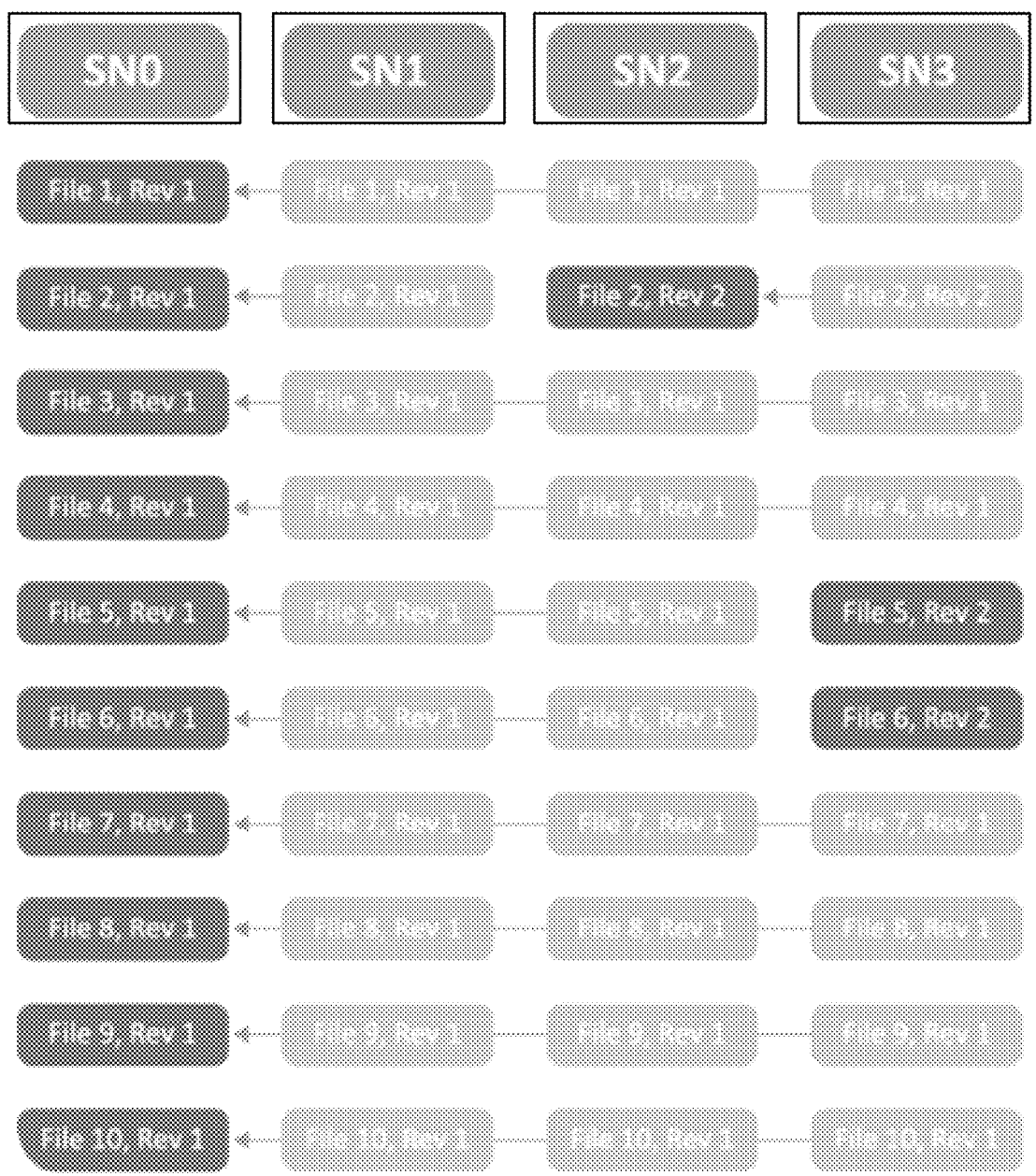
FIG. 8 is a virtual block diagram showing the relationship between first, second, third and fourth example snapshots of data in a data storage system.

Referring now to FIG. 8, a virtual block diagram showing the relationship between first, second, third and fourth example snapshots of data in a data storage system is provided. In this example, as shown by the darker grey, two files in snapshot SN3 differ from the files in snapshot SN2 is shown as File 5, Rev. 2 and File 6, Rev. 2. Because all but two of the files are the same, the current storage set, that is, the fourth storage set SN3 includes eight references to earlier versions of the files designated by lighter grey in the drawing and two actual data files of a current, newer versions of two files, namely File 5, Rev. 2 and File 6, Rev. 2. This is achieved by looping through and repeatedly executing the actions in blocks 434, 436, 438, and 439 until there are no more files to consider for the current storage set.

Figure 9:
FIG. 9 is a virtual block diagram showing the relationship between first, second, third, fourth and fifth example snapshots of data in a data storage system.

Referring now to FIG. 9, a virtual block diagram showing the relationship between first, second, third, fourth and fifth example snapshots of data in a data storage system is provided. In this example, all the files are the same so that the current storage set SN4 includes the same files as the fourth storage set SN3. Because all the files are the same between the current storage set and the most recent prior storage set the fifth storage set SN4 includes only references to earlier versions of the files designated by lighter grey in the drawing. This is achieved by looping through and repeatedly executing the actions in blocks 434, 438, and 439 until there are no more files to consider for the current storage set.

This flow of actions described in FIG. 4 and in the examples shown in FIGS. 5 through 9 continue regularly on agents and appliances to process storage backups pursuant to policies in the efficient data storage system. By implementing a data storage system pursuant to the efficient method described regarding and shown in FIG. 4, much less data than full backups or complete images is stored while the integrity and resiliency of data remain.

Pruning Stored Data

Another way the data storage system described herein is efficient is the way in which it prunes storage sets. After a retention period is reached, the older versions of files can be removed. However, because the storage sets are a combination of file references and actual data files, removing an old storage set beyond the retention period could potentially remove files to which later storage sets refer. To efficiently store data by not saving full sets of files, pruning must be done carefully. A retention set is that number of storage sets that are to be retained by the data storage system as specified by the policy for the agent and discussed above. The data storage system stores the storage sets in the retention set and also maintains some older storage sets outside or preceding the retention set referred to as a maintenance set. This is a result of the use of file references in place of data files in constructing the storage set as described above regarding FIG. 4. The pruning method is applied to the maintenance set to recapture data files and file references that are no longer needed by the data storage system.

Figure 10:
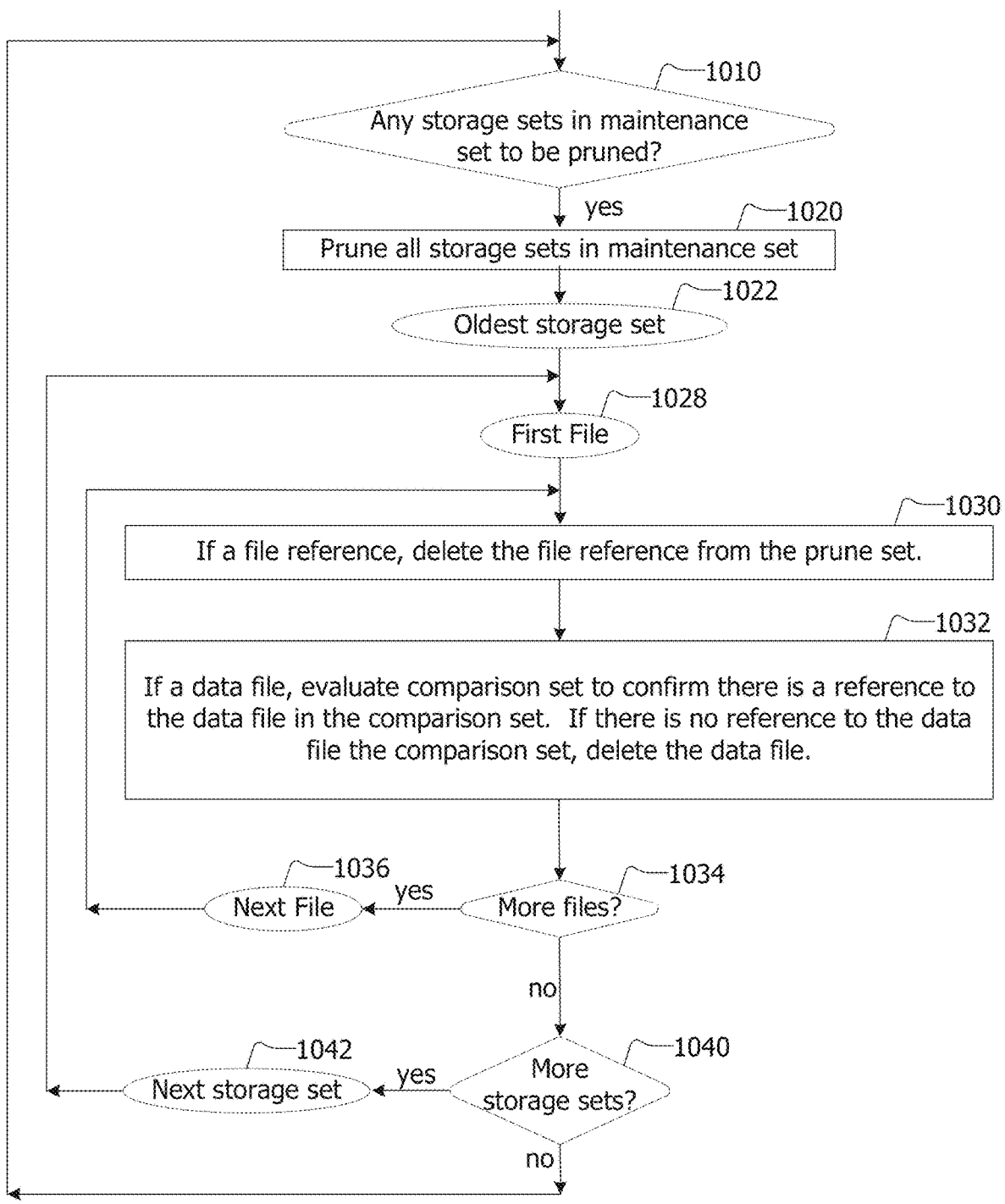
FIG. 10 is a flow chart of the actions taken to prune data in a data storage system.

To begin the pruning method of FIG. 10, a check is made to determine if there are any sets to be pruned in the maintenance set as shown in block 1010. If yes, pruning of all storage sets in the maintenance set begins, as shown in block 1020. For ease of discussion, each storage set contains two kinds of files, either file references to previous storage sets or actual data files; the maintenance set currently being pruned is called the prune set; and the oldest storage set in the retention set is called the comparison set. Pruning begins with the oldest storage set in the maintenance set as the prune set, as shown in block 1022 and works its way to the most recent storage set in the maintenance set on a file by file basis. The first file of the prune set is accessed, as shown in block 1028. For ease of discussion, the storage sets contain two kinds of files, file references and data files. (In practice, in the oldest prune set, all files are data files On a file by file basis, the current file in the prune set is evaluated.

If the current file of the prune set is a file reference to a previous set, this reference is removed and recaptured as it is no longer needed since maintenance sets keep only data files, not references, as shown in block 1030. Otherwise, the current file of the prune set is an actual data file. On a file by file basis, the comparison set is checked to determine if it references a data file in the prune set, as shown in block 1032. If not, the data file is deleted and its storage is recaptured, as shown in block 1032. If the comparison set references a data file in the prune set, the data file is kept in the prune set even though it is outside the retention set because there is at least one active link to the data file from a storage set in the retention set, namely, the comparison set which is the first recoverable set in the retention set. Since all file references in sets within the maintenance set have been removed, the only possible reference to a file must be from the first or oldest set in the retention set if the data file is to be retained. This is a reason why there is a maintenance set of storage sets outside the retention set.

A check is made to learn if there are any more files in the current prune set, as shown in block 1034. If there are additional files, the next file is accessed, as shown in block 1036 and the flow of action continues at block 1030. If there are no further files in the current prune set, as shown in block 1034, the flow of actions continues in block 1040 with a check whether there are more storage sets in the maintenance set to evaluate, as shown in block 1040. If there are additional storage sets in the maintenance set to evaluate, the next storage set is accessed and considered as the prune set, as shown in block 1042 and the flow of action continues with the first file in the prune set at block 1028. If there are no additional storage sets in the maintenance set to evaluate, the flow of actions continues at block 1010.

The way of recapturing data by pruning the data storage system described above regarding FIG. 10 becomes clear upon review of examples shown in FIGS. 11 through 14.

Figure 11:
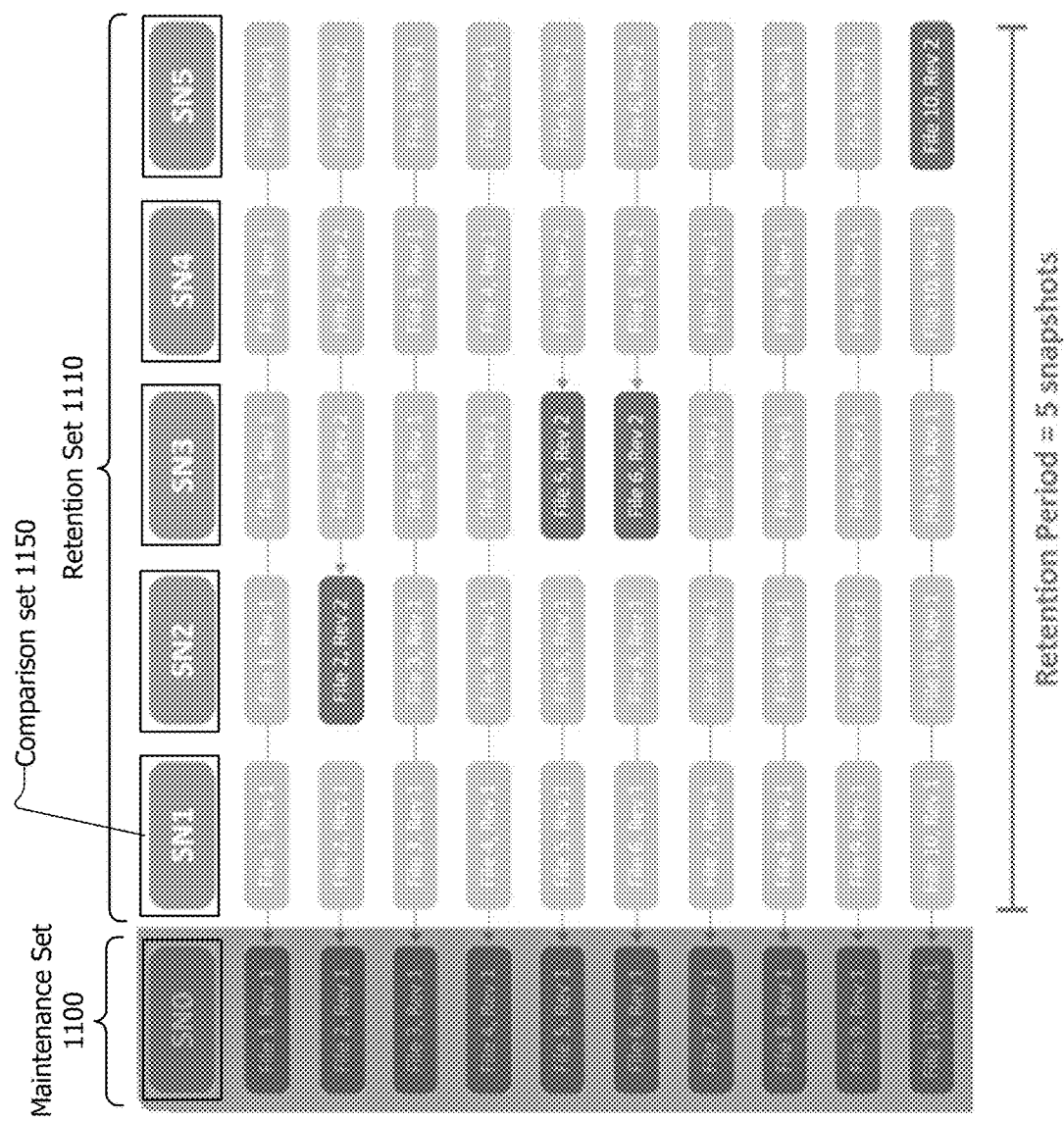
FIG. 11 is a virtual block diagram showing the relationship between first through sixth example snapshots of data in a data storage system.

Referring now to FIG. 11, a virtual block diagram showing the relationship between first through sixth example snapshots of data in a data storage system is provided. File references are depicted in light grey, and data files are depicted in dark grey. This drawing continues the example started in FIGS. 5 through 9. The drawing shows a retention set 1110 of five snapshots SN1 through SN5 (the second through sixth snapshots) and a maintenance set 1100 of SN0 (the first snapshot) as there is a retention period of five snapshots. The comparison set 1150 in this example is SN1 in retention set 1110. Applying the pruning method of FIG. 10, each file in SN0 is a data file and is evaluated to confirm there is a reference to the data file in the comparison set in the retention set (pursuant to block 1032 of FIG. 10). Because each of the files in the prune set SN0 is referenced in comparison set 1150, no data is removed.

Figure 12:
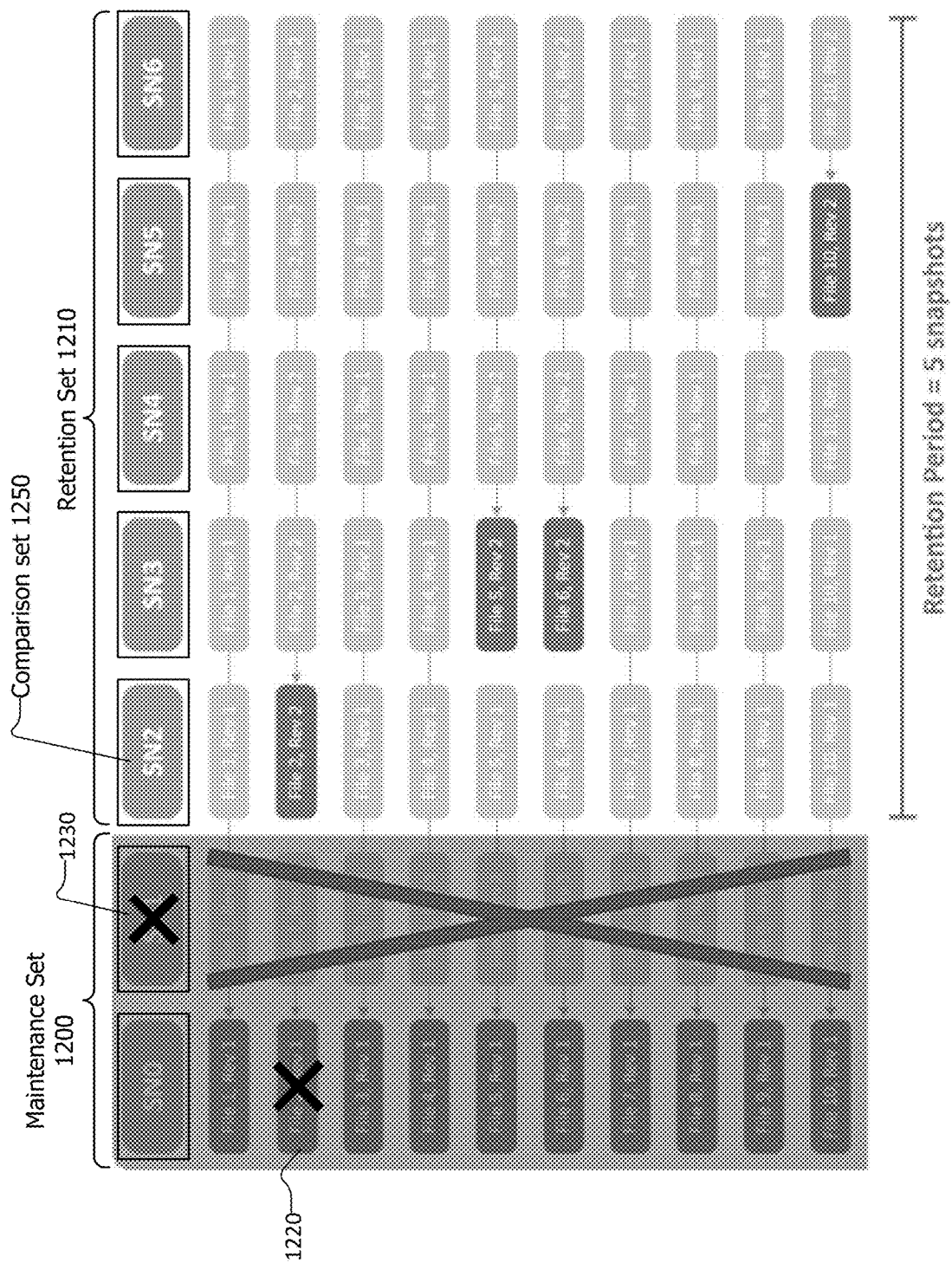
FIG. 12 is a virtual block diagram showing the relationship between first through seventh example snapshots of data in a data storage system, further showing a data file and file references to be pruned in view of the applicable retention period.

Referring now to FIG. 12, a virtual block diagram showing the relationship between first through seventh example snapshots of data in a data storage system, further showing a data file and file references to be pruned in view of the applicable retention period is provided. The drawing shows a retention set 1210 of five snapshots SN2 through SN6 (the third through seventh snapshots) and a maintenance set 1200 of two snapshots SN0 and SN1 (the first and second snapshots). The retention period of five snapshots is used throughout these examples. This is only an example number of storage sets illustrative of a retention period. The comparison set 1250 in this example is SN2 in retention set 1210. Applying the pruning method of FIG. 10, snapshot SN0 is evaluated first as it is the oldest storage set in the maintenance set 1200. Each file in SN0 is a data file and is evaluated in sequence to confirm there is a reference to the data file in the comparison set 1250 (pursuant to block 1032 of FIG. 10). Here, in this example, the comparison set 1250 no longer references data file File 2, Rev 1 in the prune set SN0. Therefore, the data file File 2, Rev 1 is removed from the prune as depicted by the large X through the file name shown by reference number 1220. Next, the files in the next storage set in the maintenance set are evaluated, which is snapshot SN1. Because each of the files in SN1 is a file reference, each of the file references is recaptured (pursuant to block 1030 of FIG. 10). The file references in SN1 are recaptured and shown crossed out. Since snapshot SN1 has no data files retained, SN1 itself is recaptured and is shown crossed out as can be seen by refence number 1230. Each of the file references will never be accessed as the snapshot is outside the retention set 1210. That is, the data storage system will not make any snapshot outside of the retention set available to a user again.

Figure 13:
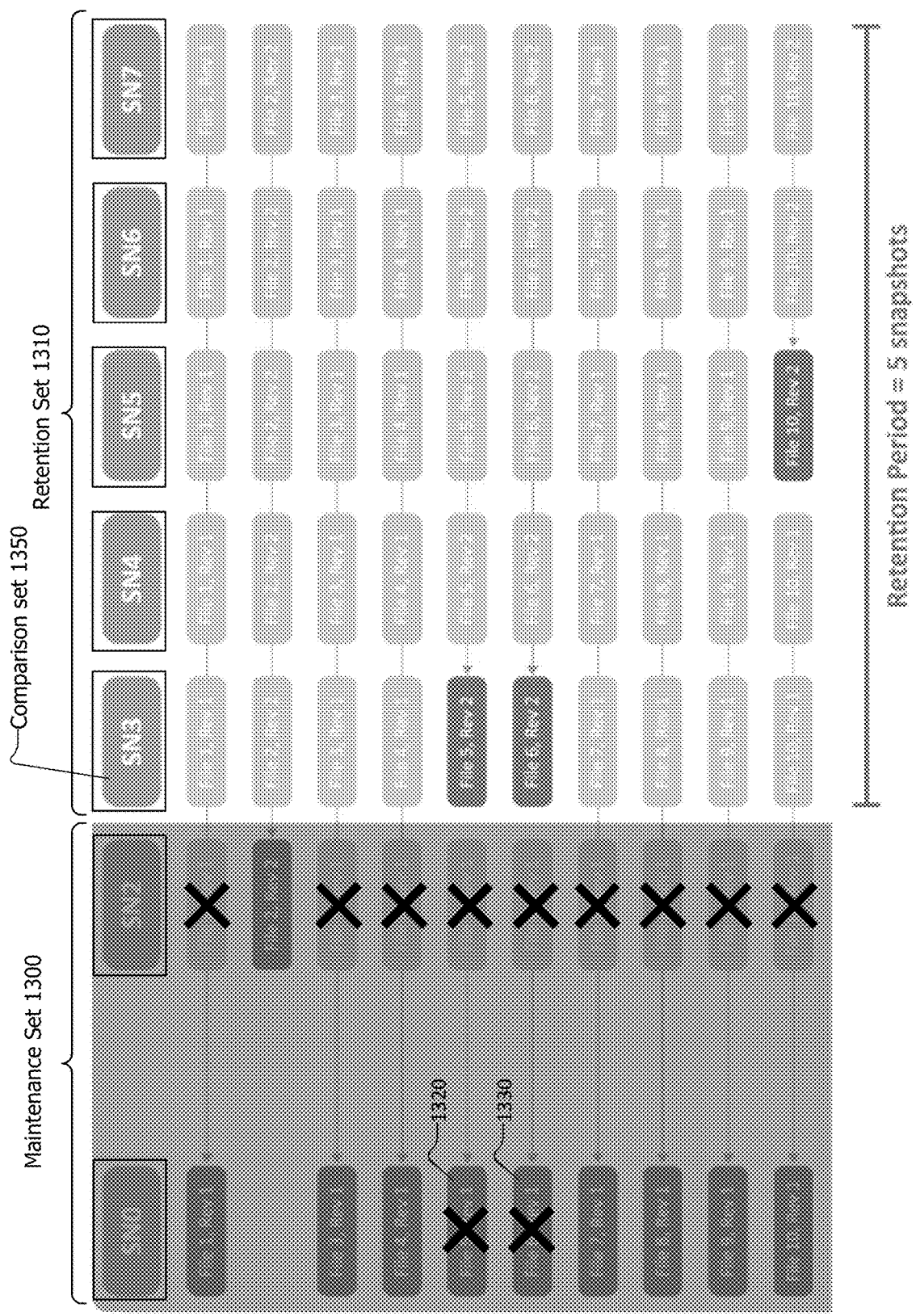
FIG. 13 is a virtual block diagram showing the relationship between first and third through eighth example snapshots of data in a data storage system, further showing data files and file references to be pruned in view of the applicable retention period.

Referring now to FIG. 13, a virtual block diagram showing the relationship between first and third through eighth example snapshots of data in a data storage system, further showing data files and file references to be pruned in view of the applicable retention period is provided. Note that snapshot SN1 was recaptured and thus removed from the data storage system. As such, it does not appear in FIG. 13. The drawing shows a retention set 1310 of five snapshots SN3 through SN7 (the fourth through eighth snapshots) and a maintenance set 1300 of two snapshots SN0 and SN2 (the first and third snapshots). The comparison set 1350 in this example is SN3 in retention set 1310. Applying the pruning method of FIG. 10, snapshot SN0 is evaluated first as it is the oldest storage set in the maintenance set 1300. Each file in SN0 is a data file and is evaluated in sequence to confirm there is a reference to the data file in the comparison set (pursuant to block 1032 of FIG. 10). Here, in this example, there is no reference to data file File 5, Rev 1 in the comparison set Therefore, the data file File 5, Rev 1 is recaptured as depicted by the large X through the file name shown by reference number 1320. Next, evaluation finds there is no reference to data file File 6, Rev 1 in the comparison set. Therefore, the data file File 6, Rev 1 is recaptured as depicted by the large X through the file name shown by reference number 1330.

Next, the files in the next storage set in the maintenance set are evaluated, which is snapshot SN2. Although each of the files are evaluated sequentially, the files in the snapshot SN2 are discussed here together. Because all but one of the files in snapshot SN2 are a file reference that is included in a snapshot in the retention set 1310, these file references are recaptured (pursuant to block 1030 of FIG. 10). The recaptured file references in SN2 are shown crossed out. Because each of the file references will never be accessed by the data storage system as the snapshot is outside the retention set 1310 and the data storage system will not make the snapshot SN2 available to a user, the data can safely be recaptured. The comparison set 1350 in this example is snapshot SN3 in retention set 1310. However, File 2 Rev 2 in SN2 is a data file. The data file File 2, Rev 2 is evaluated and determined to have a link from the comparison set (pursuant to block 1032 of FIG. 10). Here, in this example, there are multiple references to data file File 2, Rev 2 in the snapshots in the retention set 1310. Therefore, the data file File 2, Rev 2 is kept in snapshot SN2 in the maintenance set 1300.

Figure 14:
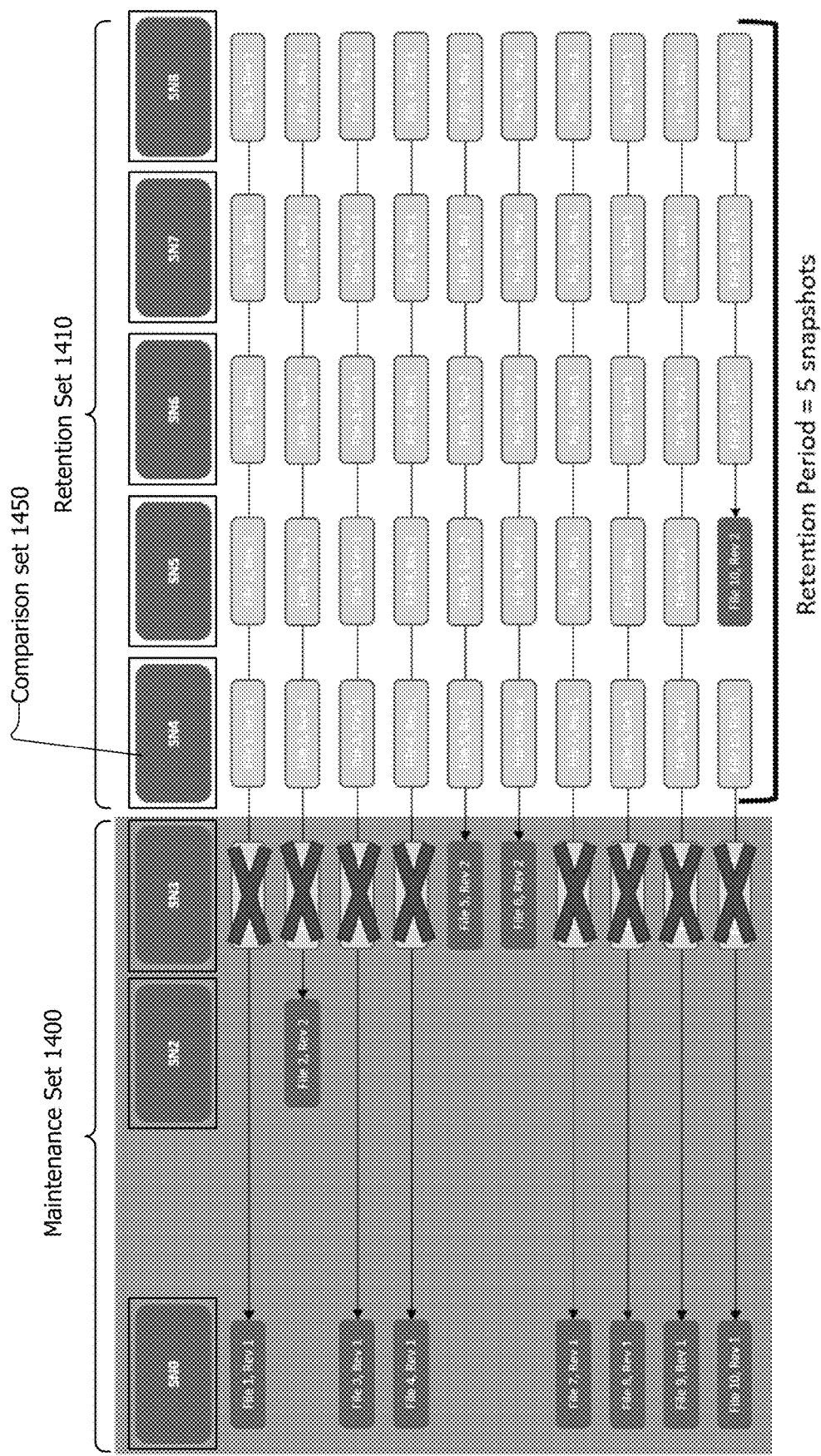
FIG. 14 is a virtual block diagram showing the relationship between first and third through ninth example snapshots of data in a data storage system, further showing file references to be pruned in view of the applicable retention period.

Referring now to FIG. 14, a virtual block diagram showing the relationship between first and third through ninth example snapshots of data in a data storage system, further showing file references to be pruned in view of the applicable retention period is provided. The drawing shows a retention set 1410 of five snapshots SN4 through SN8 (the fifth through ninth snapshots) and a maintenance set 1400 of three snapshots SN0, SN2 and SN3 (the first, third and fourth snapshots). The comparison set 1450 in this example is snapshot SN4 in retention set 1410. Applying the pruning method of FIG. 10, snapshot SN0 is evaluated first as the prune set as it is the oldest storage set in the maintenance set 1400. Each file remaining in SN0 is a data file and is evaluated in sequence to confirm there is a reference to the data file in the comparison set (pursuant to block 1032 of FIG. 10). Here, in this example, there are references to data files and no data is recaptured. Next, the files in the next storage set in the maintenance set are evaluated as the prune set, which is snapshot SN2. The lone file remaining file in snapshot SN2 is a data file, File 2, Rev 2, and it is evaluated to confirm there is a reference to the data file in the comparison set (pursuant to block 1032 of FIG. 10). Here, there is a reference to File 2, Rev in the comparison set, so no data is recaptured.

Next, the files in the next storage set in the maintenance set are evaluated as the prune set, which is snapshot SN3. Although each of the files are evaluated sequentially, the files in the snapshot SN3 are discussed here together. Because all but two of the files in snapshot SN3 are a file references, these file references are recaptured (pursuant to block 1030 of FIG. 10). The recaptured file references in SN3 are shown crossed out. Because each of the file references will never be accessed by the data storage system as the snapshot is outside the retention set 1410 and the data storage system will not make the snapshot SN3 directly available to a user, the data can safely be recaptured. However, two files in snapshot SN3 remain, File 5, Rev. 2 and File 6, Rev, 2 in SN3 are data files. These data files are evaluated to confirm there is a reference to the data files in the comparison set 1450 in the retention set 1410 (pursuant to block 1032 of FIG. 10). Here, in this example, there are references to both data files File 5, Rev. 2 and File 6, Rev, 2 in the comparison set 1450. Therefore, the data files File 5, Rev. 2 and File 6, Rev, 2 are kept in snapshot SN3 in the maintenance set 1400.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., "primary", "secondary", "tertiary", etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. A method for pruning data in an efficient data storage system comprising:
   in a maintenance set of data comprising file references and data files, evaluating each file in the maintenance set in view of an oldest storage set of data in a retention set, the evaluating including performing for each file in the maintenance set of data the following actions for a current file in the maintenance set of data
   evaluating whether a kind of the current file is file reference or data file,
   when the kind of the current file is file reference,
      deleting the current file from the maintenance set, the data storage system thus recapturing the file reference;
   when the kind of the current file is data file,
      checking whether the current file is referenced in an oldest storage set of data in the retention set by checking each file reference in the oldest storage set to learn whether the file reference refers to the current file
      when there is no reference to the current file in the oldest storage set of data in the retention set, deleting the data file from the maintenance set of data, the data storage system thus recapturing the data file.

2. A data storage system comprising a computer server including a processor and software which when executed by the processor causes the computer server to perform actions including:
   evaluating each file in a maintenance set of data in comparison to an oldest storage set of data in a retention set, the evaluating including performing for each file in the maintenance set of data the following actions for a current file in the maintenance set of data
   evaluating whether a kind of the current file is file reference or data file,
   when the kind of the current file is file reference,
      deleting the current file from the maintenance set, thus recapturing the file reference;
   when the kind of the current file is data file,
      checking whether the current file is referenced in the oldest storage set of data in the retention set by checking each file reference in the oldest storage set to learn whether the file reference refers to the current file
      when there is no reference to the current file in the oldest storage set of data in the retention set, deleting the current file from the maintenance set of data, thus recapturing the data file.

3. The method of claim 1:
wherein each of the plurality of storage sets of data include a plurality of data files and a plurality of file references.
wherein the maintenance set of data includes storage sets that preceded the retention set.
wherein the retention set includes a number of storage sets retained by the data storage system according to a policy.

4. The data storage system of claim 2:
wherein each of the plurality of storage sets of data include a plurality of data files and a plurality of file references.
wherein the maintenance set of data includes storage sets that preceded the retention set.
wherein the retention set includes a number of storage sets retained by the data storage system according to a policy.

* * * * *